(12) United States Patent
Song et al.

(10) Patent No.: US 9,620,109 B2
(45) Date of Patent: Apr. 11, 2017

(54) APPARATUS AND METHOD FOR GENERATING A GUIDE SENTENCE

(71) Applicant: SAMSUNG ELECTRONICS CO., LTD., Suwon-si (KR)

(72) Inventors: In-jee Song, Seoul (KR); Ji-hye Chung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 14/624,815

(22) Filed: Feb. 18, 2015

(65) Prior Publication Data

US 2015/0243281 A1  Aug. 27, 2015

(30) Foreign Application Priority Data

Feb. 25, 2014 (KR) ........................ 10-2014-0021999

(51) Int. Cl.
| | | |
|---|---|---|
| G10L 15/08 | (2006.01) | |
| G10L 15/22 | (2006.01) | |
| G06F 17/27 | (2006.01) | |

(52) U.S. Cl.
CPC .............. *G10L 15/08* (2013.01); *G10L 15/22* (2013.01)

(58) Field of Classification Search
CPC ... G06F 17/2881; G06F 3/167; G06Q 10/087; G07F 17/3272; G07F 17/329
USPC ...................... 704/251, 252, 9; 701/533, 428
See application file for complete search history.

(56) References Cited

U.S. PATENT DOCUMENTS

| | | |
|---|---|---|
| 5,933,139 A | 8/1999 | Feigner et al. |
| 7,502,738 B2 | 3/2009 | Kennewick et al. |
| 8,311,836 B2 | 11/2012 | Ativanichayaphong et al. |
| 8,370,130 B2 | 2/2013 | Yun et al. |
| 2002/0078045 A1 | 6/2002 | Dutta |
| 2005/0182628 A1* | 8/2005 | Choi ........................ G10L 15/08 704/252 |
| 2005/0288063 A1 | 12/2005 | Seo et al. |
| 2010/0088100 A1 | 4/2010 | Lindahl |
| 2012/0022872 A1 | 1/2012 | Gruber et al. |
| 2012/0176313 A1 | 7/2012 | Ryu et al. |

FOREIGN PATENT DOCUMENTS

| | | |
|---|---|---|
| JP | 2002297374 A | 10/2002 |
| JP | 4437047 A | 3/2010 |
| KR | 1020050017885 A | 2/2005 |

(Continued)

OTHER PUBLICATIONS

Search Report issued May 1, 2015 issued by the ISA for International Application No. PCT/KR2015/001287.

(Continued)

*Primary Examiner* — Charlotte M Baker
(74) *Attorney, Agent, or Firm* — Sughrue Mion, PLLC

(57) ABSTRACT

A server and a guide sentence generating method are provided. The method includes receiving user speech, analyzing the user speech, determining a category of the user speech from among a plurality of categories, storing the user speech in the determined category, determining a usage frequency and a popularity of each of the plurality of categories, selecting a category from among the plurality of categories based on the usage frequency and the popularity, and generating a guide sentence corresponding to the selected category.

17 Claims, 9 Drawing Sheets

(56) References Cited

FOREIGN PATENT DOCUMENTS

| KR | 10-2005-0122604 A | 12/2005 |
|----|-------------------|---------|
| KR | 10-2008-0026782 A | 3/2008 |
| KR | 10-2009-0004216 A | 1/2009 |
| KR | 10-2012-0080069 A | 7/2012 |
| KR | 10-1253104 A | 4/2013 |
| KR | 10-1309042 B1 | 9/2013 |
| WO | 2006108300 A1 | 10/2006 |

OTHER PUBLICATIONS

Written Opinion issued May 1, 2015 issued by the ISA for International Application No. PCT/KR2015/001287.

* cited by examiner

FIG. 3

| USER ID | RECENT USED DOMAIN | RECENT USED FUNCTION | RECENT USED SENTENCE STRUCTURE | RECENT USED KEYWORD |
|---|---|---|---|---|
| A | {TV control} {EPG} | {Volume up} {Search} | {$title$} {$genre$} | {ENTERTAINMENT} {HAPPY SUNDAY} |
| B | {TV control} {EPG} {VOD} | {Search} {Set Picture Quality} | {FIND $GENRE$ PRODUCED BY $DIRECTOR$ IN $YEAR$} | {NOIR} {FRANCE} {ALAN CORNEUIT} |

FIG. 4

| USER ID | DOMAIN STATISTICS | FUNCTION STATISTICS | SENTENCE STRUCTURE STATISTICS | KEYWORD STATISTICS |
|---|---|---|---|---|
| A | {TV control:90} {EPG:300} ⋮ | {Volume up:50} {Search:99} ⋮ | {$title$:99} {$genre$:20} ⋮ | {ENTERTAINMENT:100} {HAPPY SUNDAY:50} ⋮ |
| B | {TV control:400} {EPG:823} {VOD:1040} ⋮ | {Search:120} {Set Picture Quality:80} ⋮ | {FIND $GENRE$ PRODUCED BY $DIRECTOR$ IN $YEAR$:2} ⋮ | {MOVIE:30} {NOIR:20} {FRANCE:19} ⋮ |
| Global | {TV control:2,007,897} ⋮ | {Volume up:100,237} ⋮ | {$title$:187,654} ⋮ | {ENTERTAINMENT:1,597,657} ⋮ |

FIG. 5

| TYPE | COMPLEXITY | GLOBAL POPULARITY | USAGE FREQUENCY OF USER A |
|---|---|---|---|
| DOMAIN: TVCONTROL | 2 | 6 | 60 |
| DOMAIN: EPG | 4 | 3 | 70 |
| DOMAIN: VOD | 3 | 4 | 80 |
| DOMAIN: WEATHER | 1 | 5 | 30 |
| FUNCTION: TVCONTROL - VOLUME UP | 1 | 5 | 90 |
| FUNCTION: TVCONTROL - SET PICTURE QUALITY | 1 | 1 | 40 |
| FUNCTION: VOD - SEARCH | 3 | 5 | 80 |
| FUNCTION: EPG - SEARCH | 4 | 5 | 80 |
| FUNCTION: EPG - ALARM | 5 | 2 | 20 |
| SENTENCE STRUCTURE: $GENRE$ $TIMES$ | 1 | 5 | 80 |
| SENTENCE STRUCTURE: $GRADE$ VIEWING $GENRE$ | 2 | 4 | 20 |
| SENTENCE STRUCTURE: WHICH $GRADE$ VIEWING $GENRE$ AT $DATE$? | 4 | 1 | 10 |
| KEYWORD: CHILD/GRADE, GENRE | 1 | 5 | 20 |
| KEYWORD: MOVIE/GENRE | 1 | 5 | 50 |
| KEYWORD: HAPPY SUNDAY/GENRE | 3 | 5 | 70 |
| KEYWORD: NOIR/GENRE | 4 | 1 | 10 |

FIG. 6

| TYPE | COMPLEXITY | GLOBAL POPULARITY | USAGE FREQUENCY OF USER B |
|---|---|---|---|
| DOMAIN: TVCONTROL | 2 | 2 | 60 |
| DOMAIN: EPG | 4 | 3 | 70 |
| DOMAIN: VOD | 3 | 4 | 80 |
| DOMAIN: WEATHER | 1 | 5 | 10 |
| FUNCTION: TVCONTROL - VOLUME UP | 1 | 5 | 90 |
| FUNCTION: WEATHER - WEATHER | 1 | 5 | 10 |
| SENTENCE STRUCTURE: $GENRE$ $TIME$ | 1 | 5 | 80 |
| SENTENCE STRUCTURE: $DATE$ WEATHER | 2 | 4 | 10 |
| SENTENCE STRUCTURE: WHAT ABOUT $DATE$ WEATHER? | 3 | 1 | 10 |
| KEYWORD: CHILD/GRADE, GENRE | 1 | 5 | 40 |
| KEYWORD: MOVIE/GENRE | 1 | 5 | 50 |
| KEYWORD: HAPPY SUNDAY/GENRE | 3 | 5 | 70 |
| KEYWORD: NOIR/GENRE | 4 | 1 | 50 |

…

APPARATUS AND METHOD FOR GENERATING A GUIDE SENTENCE

CROSS-REFERENCE TO RELATED APPLICATION(S)

This application claims the benefit under 35 USC §119(a) of Korean Patent Application No. 10-2014-0021999, filed on Feb. 25, 2014, in the Korean Intellectual Property Office, the entire disclosure of which is incorporated herein by reference for all purposes.

BACKGROUND

1. Field

Apparatuses and methods consistent with that which is disclosed herein relate to generating a guide sentence, and more specifically, to a server that enables a user to more easily use speech recognizing functions, and a method for generating a guide sentence.

2. Description of Related Art

For users, it is beneficial to have electronic apparatuses that are more convenient to use. The controlling of electronic apparatuses was originally performed through manual inputs using controllers that were attached to electronic apparatuses. These controllers later developed into an external remote controller that can control electronic apparatuses from a near distance. Recently, a touch panel has been added to electronic apparatuses and is widely used for controlling the electronic apparatuses using a touch input.

The method for controlling electronic apparatuses using a touch input has various disadvantages, however. In particular, a user has to be close enough to the touch panel that the user can physically touch the electronic apparatus. In an effort to address these disadvantages, a speech recognizing technology has been developed. Various functions of an electronic apparatus may be input through vocal commands recognized based on the speech recognition. However, by habit, a user may use certain speech recognizing functions more than others. Further, while functions that can be controlled through user speech increase, a user may have difficulty recognizing and remembering every function that is provided.

SUMMARY

One or more exemplary embodiments overcome the above disadvantages and other disadvantages not described above. Also, the exemplary embodiments are not required to overcome the disadvantages described above, and an exemplary embodiment may not overcome any of the problems described above.

One or more exemplary embodiments may provide a server that may guide use of various speech recognizing functions, and a method for generating a guide sentence thereof.

According to an aspect of an exemplary embodiment, provided is a guide sentence generating method which includes a processor performing receiving user speech, analyzing the user speech, determining a category of the user speech from among a plurality of categories, and storing the user speech in the determined category, determining a usage frequency and a popularity of each of the plurality of categories, and selecting a category from among the plurality of categories based on the usage frequency and the popularity, and generating a guide sentence corresponding to the selected category.

The generating may include selecting a category whose usage frequency is lowest and popularity is highest from among the plurality of categories.

The plurality of categories may include at least one of a domain category regarding the user speech, a function category of an electronic apparatus that received the user speech, a sentence structure category regarding the user speech, and a keyword category regarding words included in the user speech.

The plurality of categories may include complexity information corresponding to sentence length, and the selecting the category may include selecting a category whose complexity is lowest thereby generating the guide sentence.

In response to the sentence structure category being selected, the generating may include inserting keywords included in the user speech into a sentence structure included in the selected category thereby generating the guide sentence.

In response to at least one of the domain category, the function category and the keyword category being selected, the generating may include generating the guide sentence based on pre-stored popularity.

According to an aspect of another exemplary embodiment, provided is a server which includes a communicator configured to receive user speech, a controller configured to determine a category of the user speech from among a plurality of categories, and a storage configured to store the user speech in the determined category, wherein the controller is further configured to determine a usage frequency and a popularity regarding of each of the plurality of categories, select a category from among the plurality of categories based on the usage frequency and the popularity, and generate a guide sentence corresponding to the selected category.

The controller may select a category whose usage frequency is lowest and popularity is highest from among a plurality of categories.

The plurality of categories may include at least one of a domain category regarding the user speech, a function category of an electronic apparatus used to receive the user speech, a sentence structure category of the user speech, and a keyword category regarding words included in the user speech.

The plurality of categories may include complexity information corresponding to sentence length, and the controller may select a category whose complexity is lowest thereby generating the guide sentence.

In response to the sentence structure category being selected, the controller may insert keywords included in the user speech into a sentence structure included in the selected category thereby generating the guide sentence.

In response to at least one of the domain category, the function category, and the keyword category being selected, the controller may generate the guide sentence based on pre-stored popularity.

According to an aspect of another exemplary embodiment, provided is an apparatus for generating information for speech recognition, the apparatus including a storage configured to store a usage frequency of a plurality of vocal commands corresponding to an electronic device, a controller configured to generate information about a vocal command corresponding to the electronic device based on at least one of a user's usage frequency of the vocal commands and a global user usage frequency of the plurality of vocal commands, and an outputter configured to output the information about the vocal command.

The information about the vocal command may comprise a vocal command for controlling the electronic device.

The information about the vocal command may comprise a guide statement in which keywords previously used by a user are inserted According to the above various embodiments, a user can use functions of the electronic apparatus more easily based on prior speech commands of the user and based on prior speech commands of all users.

BRIEF DESCRIPTION OF THE DRAWINGS

The above and/or other exemplary aspects and advantages will be more apparent by describing certain exemplary embodiments with reference to the accompanying drawings, in which:

FIG. 3 illustrates results of analyzing recently-spoken user speech classified according to categories according to an exemplary embodiment;

FIG. 4 illustrates accumulated results of analyzing users' speech classified according to categories according to an exemplary embodiment;

FIGS. 5 and 6 illustrate the results of analyzing user speech according to a plurality of categories according to an exemplary embodiment;

DETAILED DESCRIPTION

Figure 1:
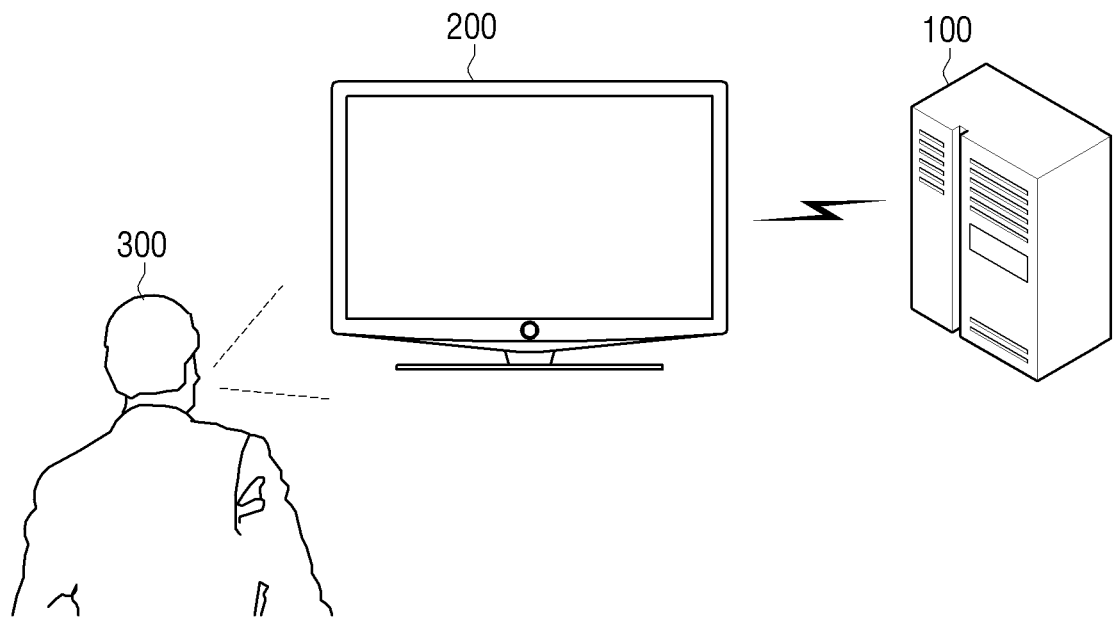
FIG. 1 illustrates a guide sentence generating system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 illustrates a guide sentence generating system 1000 according to an exemplary embodiment. Referring to FIG. 1, the guide sentence generating system 1000 may include a server 100 and an electronic apparatus 200. As discussed herein, the server 100 and the electronic apparatus may comprise one or more processing devices, for example, a central processing unit (CPU) or other processor.

The server 100 generates a guide sentence. For example, the server 100 receives and analyzes user speech spoken by a user 300 and received at or by the electronic apparatus 200. Further, when the electronic apparatus 200 receives and analyzes user speech, the server 100 may receive voice data corresponding to the user speech from the electronic apparatus 200.

The server 100 may store the results of analyzing the user speech according to a plurality of categories. Further, the server 100 may generate a guide sentence using the information stored in a plurality of categories. Examples of guide sentence generating methods will be described below.

The server 100 may include a plurality of servers such as a speech recognizing server and/or a server storing user speech analyzed results. Further, a plurality of servers such as the speech recognizing server and the server for storing user speech analyzed results may be provided externally from the server 100.

The electronic apparatus 200 may receive user speech. For example, the electronic apparatus 200 may receive user speech through a voice receiver provided internally in or externally from the electronic apparatus 200. Further, the electronic apparatus 200 may transmit the received user speech to the server 100 while processing speech recognition of the user speech and transmit speech recognized data corresponding to the speech recognizing results to the server 100.

The electronic apparatus 200 may receive and output the guide sentence generated by the server 100. For example, the electronic apparatus 200 may display the guide sentence in text format and may output the guide sentence through a speaker. Further, the electronic apparatus 200 may output the guide sentence at preset intervals or in response to a user command to output the guide sentence.

The electronic apparatus 200 may be TV as illustrated in FIG. 1. As another example, the electronic apparatus 200 may be implemented as any of various electronic apparatuses such as a mobile phone, a computer, a PDP, a tablet PC, a home theater, a laptop, an appliance, a refrigerator, a washing machine, a set-top box, and the like.

Figure 2:
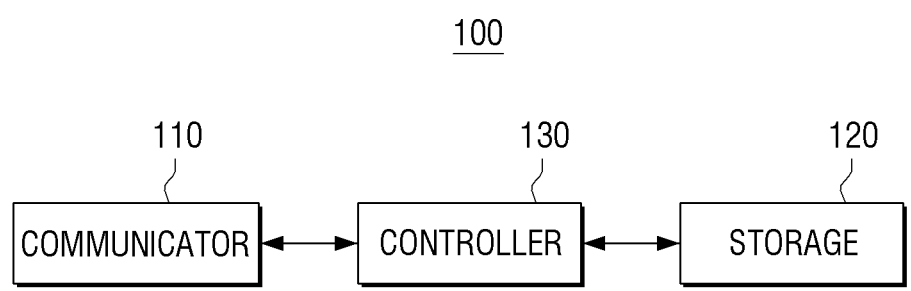
FIG. 2 is a block diagram of a server according to an exemplary embodiment.

FIG. 2 is a block diagram of the server 100 according to an exemplary embodiment. Referring to FIG. 2, the server 100 includes a communicator 110, a storage 120, and a controller 130.

The communicator 110 performs communication with any of various types of external devices according to any of various types of communication methods. For example, the server 100 may receive user speech and/or voice data in which user speech is speech-recognized from the communicator 110. Further, the communicator 110 may transmit the generated guide sentence from the server 100 to the electronic apparatus 200 illustrated in FIG. 1.

For example, the communicator 110 may include any of various communication chips such as a WiFi chip, a Bluetooth chip, a near field communication (NFC) chip, a wireless communication chip, and the like. Herein, WiFi chip, Bluetooth chip and NFC chip perform communication respectively according to WiFi method, Bluetooth method or NFC method. The NFC chip operates according to NFC (Near Field Communication) method, for example, using 13.56 MHz among various RF-ID frequency bandwidths such as 135 kHz, 13.56 MHz, 433 MHz, 860~960 MHz, and 2.45 GHz. When WiFi chip or Bluetooth chip is used, various connection information such as a service set identifier (SSID) and session key may be first exchanged, communication may be connected according to the connecting information, and various information may be exchanged. The wireless communication chip performs communication according to various communication standards such as IEEE, Zigbee, 3G ($3^{rd}$ Generation), 3GPP ($3^{rd}$ Generation Partnership Project), LTE (Long Term Evolution), and the like.

As another example, when an external server such as a speech recognizing server or server for storing user speech analyzed results is provided externally from the server 100, the server 100 may perform communication with the external server through the communicator 110.

The storage 120 stores the analyzed results regarding user speech. For example, the storage 120 may classify and store the analyzed results regarding user speech in a category corresponding to the user speech from among a plurality of categories.

The plurality of categories may include at least one from among a domain category regarding the user speech, a function category regarding the electronic apparatus used through the user speech, a sentence structure category regarding the user speech and a keyword category regarding words included in the user speech. Accordingly, the server 100 may store the analyzed results of user speech according to the categories.

The controller 130 controls overall operation of the server 100. For example, the controller 130 may determine the usage frequency and the popularity of each category among a plurality of categories. Further, the controller 130 may select one category from the plurality of categories based on the usage frequency and the popularity, and generate a guide sentence corresponding to the selected category. As an example, the controller 130 may generate a guide sentence by selecting a category that has a usage frequency that is low and a popularity that is high from among the plurality of categories.

The plurality of categories may include complexity information corresponding to the sentence length. The complexity may be used to indicate information regarding the sentence length, which may be numerically expressed in proportion to the sentence length. For example, the complexity may be expressed with the numbers between 0 to 9 with the number 9 representing the highest complexity. The word "weather" may be expressed with a complexity of 1, while the sentence "Show noir movie produced by French movie director A," may be expressed with a complexity of 8.

When a plurality of categories are selected based on the usage frequency and the popularity, the controller 130 may select a category having the lowest complexity as category for generating a guide sentence. Thus, the controller 130 may select a category whose usage frequency and popularity are high, and complexity is low for generating guide sentence.

As another example, if the sentence structure category is selected among the plurality of categories, the controller 130 may generate a guide sentence by inserting keywords included in the user speech into a sentence structure included in the selected category. When at least one of the domain category, the function category, and the keyword category is selected, the controller 130 may generate a guide sentence based on the pre-stored popularity.

The following will explain specific methods generating a guide sentence by referring to FIGS. 3 to 6. In these examples, the server 100 may analyze and store user speech according to a plurality of categories.

According to various aspects, the guide sentence may include a one word command, a plurality of words making up a command, a statement, a vocal command, and the like, which may be used to control an electronic apparatus. For example, the guide sentence may be provided to a user to assist the user or to suggest a command for controlling an electronic apparatus.

Referring to FIGS. 3 and 4, the plurality of categories include the domain category regarding the user speech, the function category regarding the electronic apparatus that received the user speech, the sentence structure category regarding the user speech, and the keyword category regarding words included in the user speech. However, it should be appreciated that this is merely one exemplary embodiment, and any other category that can distinguish the user speech may be included.

The domain category may include sub-categories such as TV control, EPG (Electronic Program Guide), VOD and weather, and indicates a field or area corresponding to the user speech.

The function category may include functions that can be used by a user regarding each domain. For example, the function category may include sub-categories such as a volume adjusting function, a screen quality adjusting function, and the like in the TV control domain. As another example, the function category may include sub-categories such as a searching function, an alarm function, and the like in the EPG domain.

The sentence structure category is a category indicating a sentence structure of the user speech. For example, the user utterance "Find A program" may correspond to a "Find $title$" category which is sub-category of the sentence structure category. As another example, the user utterance "drama" may correspond to a "$genre$" category which is a sub-category of the sentence structure category.

The keyword category is category indicating keywords included in the user speech. For example, the keyword category may include sub-categories regarding various keywords such as "drama," "entertainment," "movie," "France," and "Alan Corneuit."

FIG. 3 illustrates a table storing the analyzed results of user speech which are previously spoken by users A and B according to categories. That is, the server 100 may store the analyzed results of user speech according to users. Further, the server 100 may transmit the analyzed results of speech regarding each user to the electronic apparatus of the corresponding user through the communicator 110.

Referring to FIG. 3, user A has previously spoken an utterance related with "TV control" and "EPG," specifically, an utterance to use "Volume Up" and "Search" functions. In this example, the sentence structures previously used by the user A is "$title$" and "$genre$" which are relatively simple. The keywords included in the user speech previously spoken by user A are "entertainment" and "happy Sunday."

User B has previously spoken an utterance related with "TV control," "EPG" and "VOD," specifically, an utterance to use "Search" and "Set Picture Quality" functions. In this example, the sentence structure previously used by user B is "find $genre$ produced by $director$ in $year$." The keywords included in the user speech previously spoken by user B are "noir," "France" and "Alan Corneuit."

The server 100 may accumulate and store the analyzed results of user speech spoken by each user according to categories, as illustrated in FIG. 4. Further, the server 100 may accumulate and store the analyzed results of user speech spoken by each user using electronic apparatuses that can connect the server 100 in a wired or wireless manner. For example, as illustrated in FIG. 4, the analyzed results of user speech spoken by all of the users is defined as Global users, accumulated and stored according to categories.

Referring to FIG. 4, user A has previously spoken an utterance related with "TV control" and "EPG" 90 times and 300 times, respectively. Specifically, user A has made utterances to use the "Volume Up" and "Search" functions 50 times and 99 times, respectively. Further, user A's has previously used the sentence structure of "$title$" 99 times, and the sentence structure of "$genre$" 20 times. Further, in the keyword category, user A has uttered "entertainment" 100 times, and "happy Sunday" 50 times.

Meanwhile, user B has spoken an utterance related with "TV control," "EPG" and "VOD" 400 times, 823 times, and 1040 times, respectively. Specifically, user B has previously made the utterance "Search" and "Set Picture Quality" functions 120 times and 80 times, respectively. Further, user B's has previously used the sentence structure of "Find $genre$ produced by $director$ in $year$" 2 times. Further, in the keyword category, user B has previously spoken the term "movie" 30 times, "noir" 20 times, and "France" 19 times.

The server 100 may accumulate and store all of the user speech received by the server 100 including users A and B or the analyzed results of user speech according to categories.

For example, as illustrated in FIG. 4, Global users have made previous utterances related with "TV control" 2,007,897 times, specifically, utterances to use "Volume up" function 100,237 times. Further, the Global users have used the sentence structure of "$title$" 187,654 times, and "entertainment" 1,597,657 times in the keyword category.

The server 100 may classify the analyzed results of user speech regarding each user over a preset period of time or an entire period of time and store the results according to categories. Further, the server 100 may accumulate and store all of the user speech received by the server 100 or the analyzed results of user speech according to categories. Although FIG. 4 illustrates that the analyzed results of the user speech spoken by Global users for an entire period are stored, the server 100 may store the analyzed results of user speech spoken over a preset period according to categories regarding Global users.

FIG. 5 illustrates the complexity and the Global popularity regarding each category and the usage frequency of user speech regarding user A in each category based on the above descriptions.

The server 100 may determine and store the complexity and the Global popularity as a number between 0 to 9. In this example, as the number is bigger, the complexity is higher, the sentence is longer, and the Global popularity is higher. The speaking frequency of all the users using electronic apparatuses that can connect to the server 100 is high. Further, the server 100 may determine the usage frequency of a user as a number between 0 to 99. The usage frequency may be also proportional to the numbers indicating the usage frequency.

For example, the "Domain: TV control" category which is sub-category of the domain category, includes user speech having a relatively short length such as "Volume up" and "Channel down." Thus, regarding the "Domain: TV control" category, the number indicating the complexity is 2, which is low. Further, as illustrated in FIG. 4, because the Global users speak the "Domain: TV control" 2,007,897 times, the usage frequency of all of the users is high. Thus, the Global popularity is at 6. Further, as illustrated in FIGS. 3 and 4, user A continuously performs speech related with "TV control." Therefore, the usage frequency of user A with respect to the "Domain: TV control" becomes 60.

The controller 130 may select at least one category among a plurality of categories as illustrated in FIG. 5. According to various aspects, the controller 130 may select one from a plurality of categories based on the Global popularity and the usage frequency of a user. As an example, the controller 130 may select a category whose Global popularity is high, i.e., the frequency used by a plurality of users is high, and usage frequency of a user is low, i.e., a category that is not so often spoken by the user.

The following is an example in which user A recently speaks "Pororo™," "child" and "animation" based on the case of FIG. 5. The controller 130 may determine that user A speaks short statements constituted by one word. Therefore, the controller 130 may determine that the sentence structure recently spoken by user A has features, and select the sentence structure category among the domain category, the function category, the sentence structure category, and the keyword category.

For example, the domain category may be an upper category, the function category may be a lower category of the domain category, the sentence structure category may be a lower category of the function category, and the keyword category may be a lower category of the sentence structure category.

Accordingly, when the controller 130 selects the sentence structure category as a category for generating a guide sentence, the keyword category which is a lower category of the sentence structure category may be included. Accordingly, if a proper guide sentence cannot be generated within the selected sentence structure category, the controller 130 may generate guide sentence within the keyword category which is lower category of the sentence structure category.

As another example, when the sentence structure category is selected, the controller 130 may generate a guide sentence by inserting keywords included in the user speech into a sentence structure included in the selected category.

For example, referring to FIG. 5, a sub-category whose Global popularity is high and usage frequency of user A is low within the SENTENCE STRUCTURE category is "$grade$" viewing "$genre$" category as highlighted in a darker format than the other sub-categories. Thus, the controller 130 may generate a guide sentence by selecting "$grade" viewing "$genre$" category, and inserting the words recently spoken by user A, "Pororo™", "child" and "animation". Thus, the controller 130 may suggest "Child viewing animation" as a guide sentence.

Further, the controller 130 may select sub-categories such as "Keyword: child/grade, genre," "Keyword: movie/genre" and "Keyword: noir/genre" categories whose Global popularity is high and usage frequency of user A is low within the keyword category which is a lower category of the sentence structure category. The controller 130 may generate a guide sentence by using words frequently spoken by other users based on the Global popularity and corresponding to the categories of "Keyword: child/grade, genre," "Keyword: movie/genre" and "Keyword: noir/genre".

For example, another user B recently spoke keywords such as "noir," "France" and "Alan Corneuit." Thus, the controller 130 may generate "Child viewing noir" as a guide sentence by combining the "$grade$ viewing $genre$" category which is a preselected sentence structure category with the keywords spoken by user B and user A.

According to various aspects, the controller 130 may generate sentences by inserting the keywords spoken by user A and/or other users into a sentence structure within the sentence structure category, and output the corresponding sentence to the analyzed results of user speech which have been analyzed or received through the server 100 as a guide sentence from among a plurality of the generated sentences.

The server 100 may previously establish a number of categories that can be selected. When more than a preset number of categories are selected, the controller 130 may select a category by considering the complexity of the categories. If a user normally speaks short words or short sentences when using the speech recognizing functions, the controller 130 may select a category having low complexity from a plurality of categories. As another example, the server 100 may select a category by considering the complexity, the Global popularity, and the usage frequency of a user. For example, the server 100 may select a category whose complexity is low, Global popularity is high, and usage frequency of a user that is low as a category for generating a guide sentence.

FIG. 6 illustrates the complexity, the Global popularity, and the usage frequency of user speech spoken by user B regarding each category.

Referring to FIG. 6, the server 100 may determine and store the complexity and the Global popularity as a number between 0 to 9. In this example, as the number is bigger, the complexity is bigger, the sentence length is longer, and the Global popularity is higher. The server 100 may determine the usage frequency of a user as a number between 0 to 99. The usage frequency may be also proportional to the numbers indicating the usage frequency.

For example, the "Domain: EPG" category which is sub-category of the domain category includes user speech having a length such as "Search actors on the scripts" and "Show the summarized story." Thus, the "Domain: EPG" category may have a complexity of 4, which is middle value from 0 to 9. Further, because the Global popularity is high according to the usage frequency of all users, the Global popularity may be 3. Further, as illustrated in FIGS. 3 and 4, user B continuously performs speech related with "EPG." Thus, the usage frequency of user B becomes 70.

The controller 130 may select at least one category among a plurality of categories referring to FIG. 6. The controller 130 may select one category among a plurality of categories based on the Global popularity and the usage frequency of a user. Specifically, the controller 130 may select a category whose Global popularity is high, i.e., the usage frequency of a plurality of users is high, and a usage frequency of a particular user is low, i.e., that a user does not so often use.

The following is an example an example in which user B has recently spoken "Which French noir movie is produced by X director?" "Which documentary is produced by Y director?" and "Find a horror movie that Z actor acts" based on the case of FIG. 6. The controller 130 may analyze user speech spoken by user B, and determine that the speech of user B is related to performing a search regarding movies. Thus, the controller 130 may determine that recent speech of user B has features in a domain, and select the domain category among the domain category, the function category, the sentence structure category, and the keyword category.

Therefore, when the controller 130 selects the domain category as a category for generating a guide sentence, the function category, the sentence structure category and the keyword category which are lower categories may be also included. When a proper guide sentence cannot be generated within the selected sentence structure category, the controller 130 may generate a guide sentence within the function category, the sentence structure category, and the keyword category which are lower categories. Further, when the controller 130 cannot clearly determine which category the speech of a user belongs to, the controller 130 may select the domain category as a category for generating a guide sentence, allowing the scope of the category for generating a guide sentence to become wider.

Further, the controller 130 may generate a guide sentence based on the pre-stored Global popularity in response to the domain category being selected. For example, referring to FIG. 6, a sub-category whose Global popularity is high and usage frequency of user B is low within the domain category is the "Domain: weather" category. Therefore, the controller 130 may select the "Domain: weather" category, and generate a guide sentence corresponding to the "Domain: weather" category.

Specifically, as illustrated in FIG. 6, because a "Function: weather—weather" category within the function category and "$date$ weather" or "What about $date$ weather?" category within the sentence structure category have a high Global popularity and a low usage frequency of user B, the controller 130 may generate a guide sentence corresponding to "Domain: weather," "Function: weather—weather," and "$date$ weather" or "What about $date$ weather?" categories.

The server 100 may previously establish a number of categories that can be selected. For example, when more than a preset number of categories are selected, the controller 130 may select a category by considering the complexity.

As an example, if a user normally speaks short words or short sentences when using the speech recognizing functions, the controller 130 may select a category whose complexity is low from a plurality of categories.

Further, the server 100 may select a category by considering the complexity, the Global popularity, and the usage frequency of a user. For example, the server 100 may select a category whose complexity is low, Global popularity is high and usage frequency of a user is low as a sentence to be used as a guide sentence.

Figure 7:
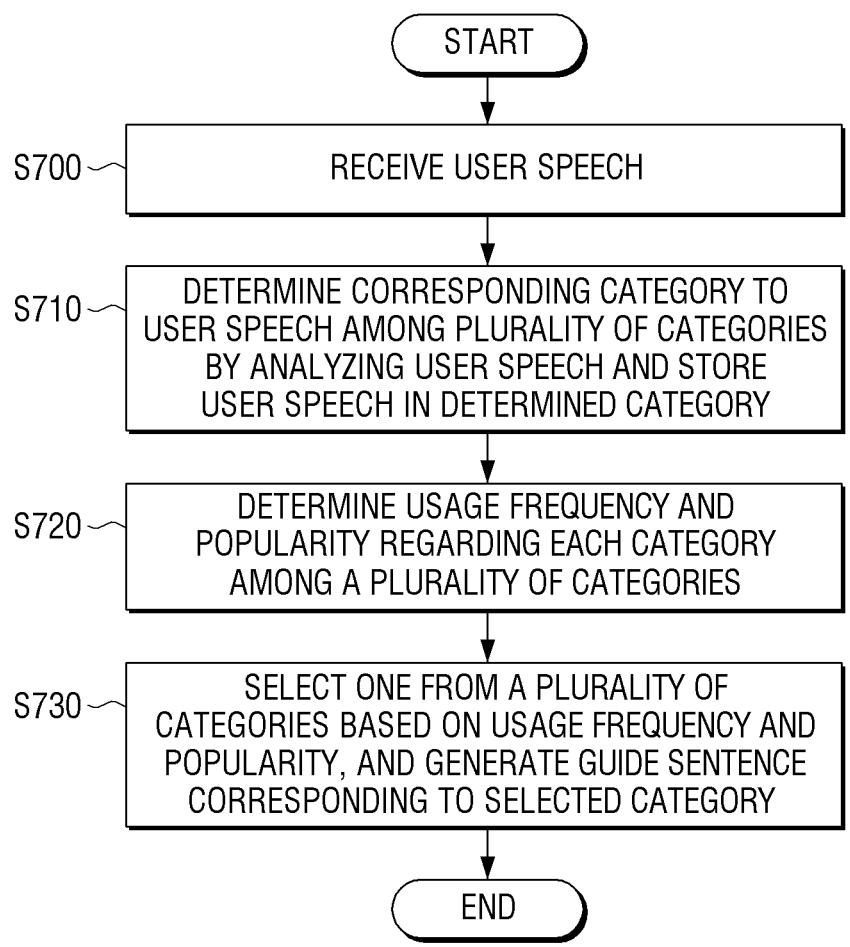
FIG. 7 is a flowchart illustrating a method for generating a guide sentence according to an exemplary embodiment.

FIG. 7 is a flowchart of a method for generating a guide sentence according to an exemplary embodiment.

Referring to FIG. 7, at S700, the server 100 receives user speech. For example, the server 100 may receive and analyze user speech received by an electronic apparatus such as TV. The server 100 may analyze user speech by transmitting the received speech to an external user speech analyzing server. Further, when the electronic apparatus receives and analyzes user speech, the server 100 may receive speech data corresponding to the user speech from the electronic apparatus.

At S710, the server 100 determines a category of speech corresponding to the user speech from among a plurality of categories by analyzing user speech and stores the user speech in the determined category. A plurality of categories may include at least one among the domain category regarding the user speech, the function category regarding the electronic apparatus used to receive the user speech, the sentence structure category regarding the user speech, and the keyword category regarding words included in the user speech. Thus, the server 100 may store the analyzed results regarding the user speech according to categories.

At S720, the server 100 determines the usage frequency and the popularity of each of the plurality of categories. The usage frequency is proportional to a particular user using a sentence corresponding to each category, and the popularity is proportional all users using a sentence corresponding to each category.

At S730, the server 100 selects a category from among a plurality of categories based on the usage frequency and the popularity, and generates a guide sentence corresponding to the selected category. As an example, the server 100 may generate a guide sentence by selecting a category whose usage frequency is lowest and popularity is highest among a plurality of categories.

Figure 8:
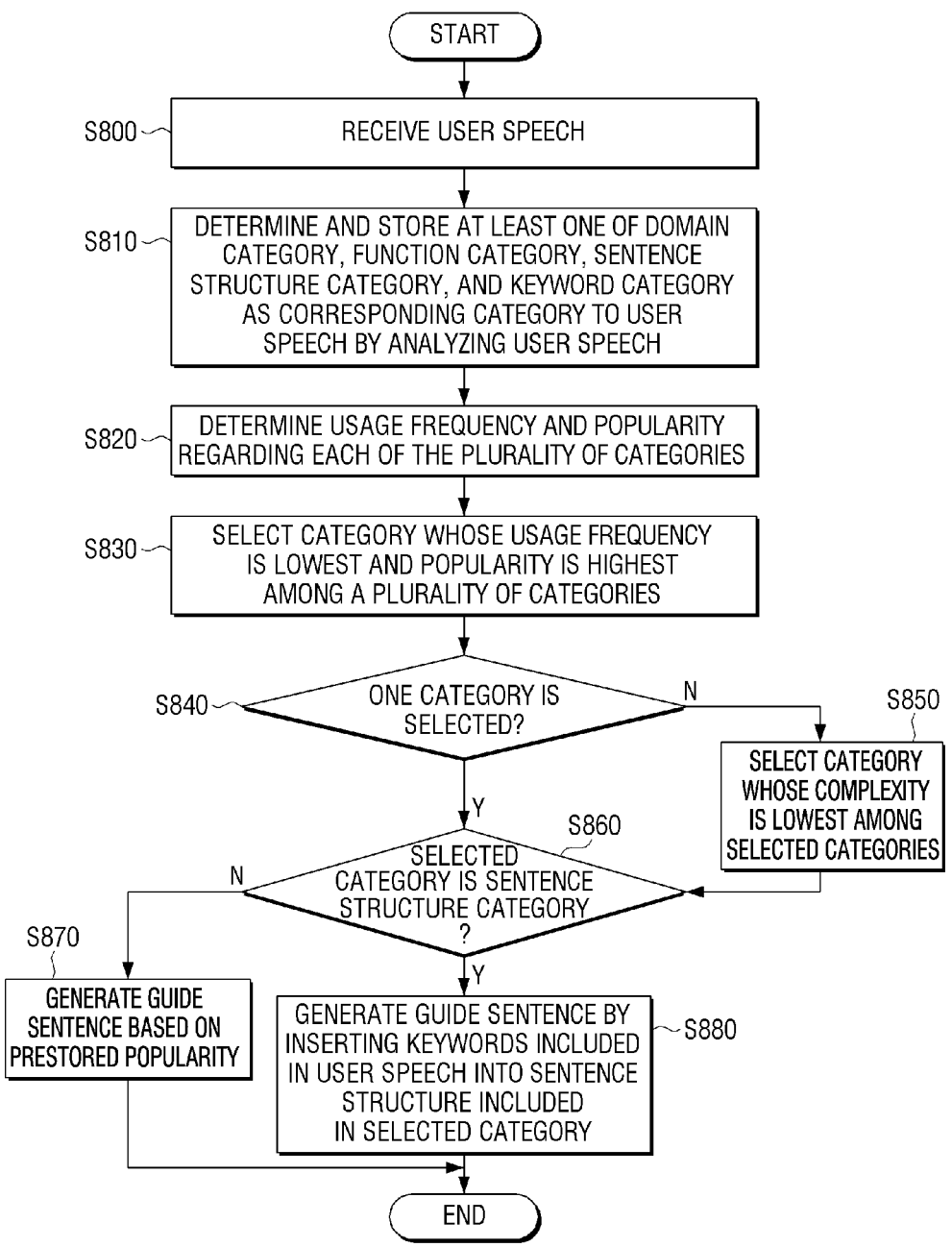
FIG. 8 is a flowchart illustrating a method for generating guide sentence according to another exemplary embodiment.

FIG. 8 is a flowchart illustrating a method for generating guide sentence according to another exemplary embodiment.

Referring to FIG. 8, at S800, the server 100 receives user speech. For example, the server 100 may receive and analyze user speech received by an electronic apparatus such as TV. The server 100 may analyze user speech by transmitting the received user speech to an external user speech analyzing server. Further, when the electronic apparatus receives and analyzes the user speech, the server 100 may receive speech data corresponding to the user speech from the electronic apparatus.

At S810, the server 100 determines and stores at least one of the domain category, the function category, the sentence structure category, and the keyword category as category corresponding to the user speech by analyzing the user speech. Thus, the server 100 may store the analyzed results regarding the user speech according to a plurality of preset categories.

At S820, the server 100 determines the usage frequency and the popularity of each of the plurality of categories. The usage frequency is proportional to a particular user using a sentence corresponding to each category, and the popularity is proportional to global users using a sentence corresponding to each category.

At S830, the server 100 selects a category that has a usage frequency that is lowest and a popularity that is highest among a plurality of categories. For example, the server 100 may select a category from among a plurality of categories based on the usage frequency and the popularity. As an example, the server 100 may select a category in which the popularity is high because other users use the category a lot while the usage frequency is low because the corresponding user seldom uses the category.

As another example, the server 100 may select a plurality of categories up to a preset number of categories. For example, when a preset number of categories that can be selected is one, and when three categories that have a usage frequency and popularity that are uniform to each other are selected, the server 100 may select one category according to certain standards.

At S840, the server 100 determines whether the number of the selected categories is one or not. When one category is not selected even though a preset number is one at S840 (i.e. N), the server 100 selects a category that has a complexity that is lowest among the selected categories, at S850.

The complexity indicates information about the sentence length, and may be measured with numbers so as to be proportional to the sentence length. For example, the complexity may be expressed with a number between 0 to 9. For example, the word, "weather," may be expressed with a complexity of 1, and the sentence, "Show a noir movie produced by French director A," may be expressed with a complexity of 8.

When one category is selected at S840 (i.e. Y), or when one category is selected by selecting a category whose complexity is lowest at S850, the server 100 determines whether the selected category is a sentence structure category or not, at S860.

When the selected category is not a sentence structure category at S860 (i.e. N), for example, when the selected category is a domain category, a function category, and a keyword category, the server 100 generates guide sentence based on a pre-stored popularity, at S870. Thus, when the selected category is a domain category, function category, or keyword category, the server 100 may generate guide sentence using the domain category or the keyword category that has a usage frequency of all users that is high.

However, when the selected category is a sentence structure category at S860 (i.e. Y), a guide sentence is generated by inserting keywords included in the user speech into a sentence structure included in the selected category, at S880. Further, the server 100 may also generate a guide sentence by inserting keywords whose usage frequency of all global users that is high into a sentence structure included in the selected category.

Figure 9:
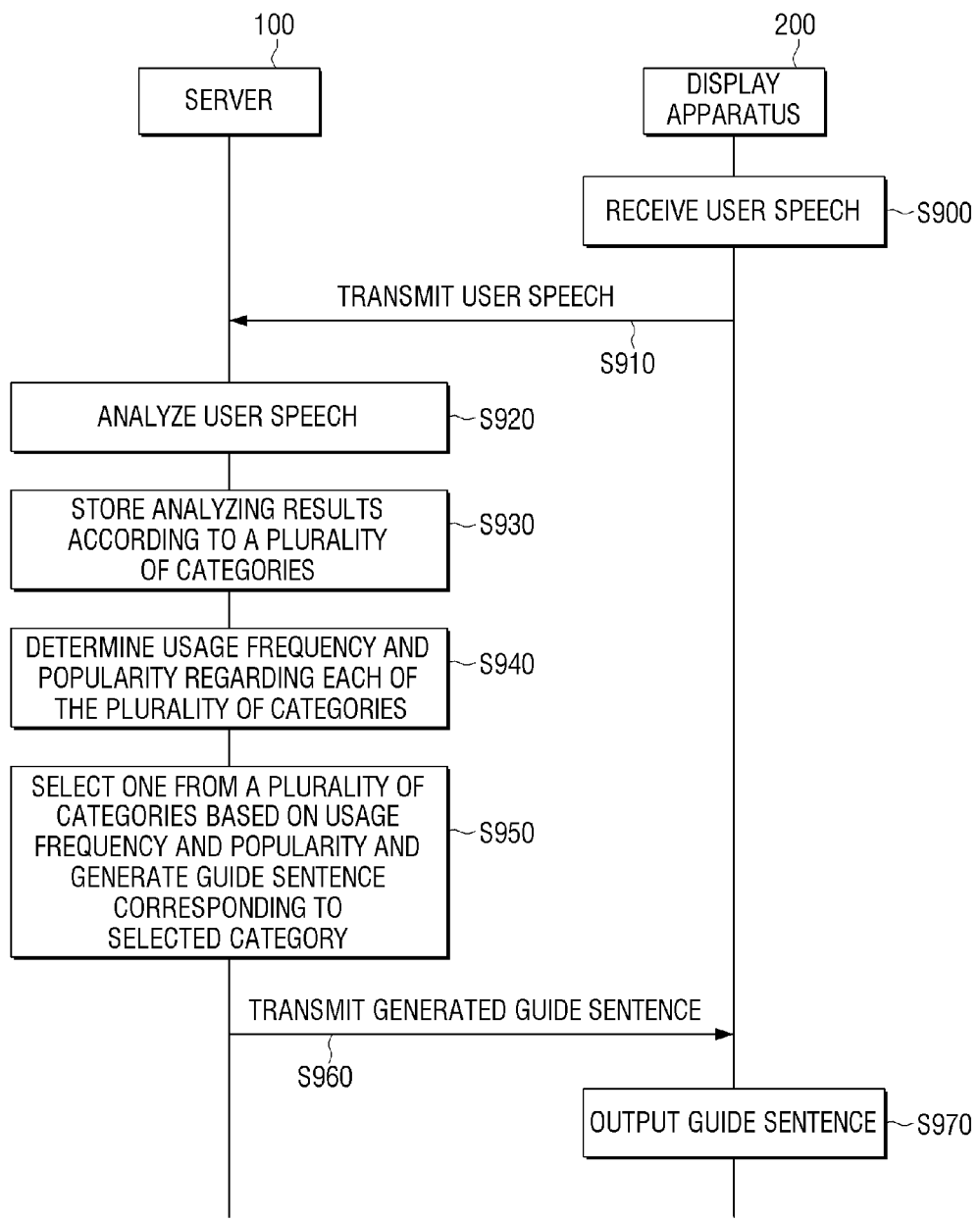
FIG. 9 is a sequence diagram illustrating a method for generating a guide sentence according to an exemplary embodiment.

FIG. 9 is a sequence diagram illustrating a method for generating a guide sentence in the server according to an exemplary embodiment. FIG. 9 illustrates the display apparatus 200 including a display such as a TV, a mobile phone, a laptop, a computer, an appliance, and the like.

The display apparatus 200 receives user speech, at S900, and transmits the user speech to the server 100, at S910. The display apparatus 200 may transmit the user speech to the server 100, however, in some examples the display apparatus 200 may perform the analyzing of the user speech and also transmit voice data corresponding to the user speech.

The server 100 analyzes the user speech, at S920. At S930, the server 100 stores the analyzed results according to a plurality of categories, and determines the usage frequency and the popularity of each of the plurality of categories, at S940. At S950, the server 100 generates a guide sentence corresponding to the selected category after selecting one category from among the plurality of categories based on the usage frequency and the popularity.

For example, a plurality of categories may include at least one among the domain category of the user speech, the function category of the electronic apparatus that receives the user speech, the sentence structure category of the user speech, and the keyword category of words included in the user speech. Thus, the server 100 may store the analyzed results regarding the user speech according to categories.

At S960, the server 100 transmits the generated guide sentence to the display apparatus 200. Further, the display apparatus 200 outputs the guide sentence, at S970. For example, the display apparatus 200 may output the guide sentence in text or image format through the display. As another example, the display apparatus 200 may output the guide sentence through the speaker. The display apparatus 200 may output the guide sentence according to preset period or according to user requests.

Further, the display apparatus 200 may output UI to inform a viewer that the guide sentence can be output on a part of the display at preset intervals. In this example, in response to receiving a user command to select UI, the display apparatus 200 may output the guide sentence.

According to the above guide sentence generating methods, a user can perform a vocal command to use various functions using the guide sentence to support the usage of the various functions from among the speech recognizing functions.

While the examples described herein illustrate a server performing the operation of providing a guide sentence to an electronic apparatus. In some examples, the method and apparatus for determining the guide sentence may be provided locally on an electronic apparatus without the use of a separate server.

The guide sentence generating methods of the server according to the above described various embodiments may be coded to be software and stored in a non-transitory readable recording medium. A non-transitory readable recording medium can be loaded and used in various devices. The term non-transitory computer readable recording medium refers to a medium which stores data permanently or semi-permanently and can be read by devices, not a medium storing data temporarily such as register, cache, or memory. Specifically, the above various applications or programs may be stored and provided in a non-transitory computer readable recording medium such as CD, DVD, hard disk, Blu-ray disk, USB, memory card, ROM, or the like, as would be understood by one of skill in the art.

Further, the foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims.

What is claimed is:

1. A guide sentence generating method implemented by one or more processors, the guide sentence generating method comprising:
    receiving speech data corresponding to user speech from an electronic apparatus;
    analyzing the speech data, determining a category of the speech data from among a plurality of categories, and storing the analyzed speech data in the determined category;
    determining a usage frequency and a global popularity of each of the plurality of categories, wherein the usage frequency comprises a count of speech data of an individual user and the global popularity comprises a count of speech data of a plurality of users;
    selecting a category from among the plurality of categories based on the usage frequency and the global popularity;
    generating a guide sentence corresponding to the selected category;
    transmitting the guide sentence to the electronic apparatus; and
    providing the guide sentence to the user in at least one of visual and audio form, so that the user may command the electronic apparatus using the guide sentence.

2. The method of claim 1, wherein the selecting comprises selecting a category whose usage frequency is lowest and global popularity is highest from among the plurality of categories.

3. The method of claim 1, wherein the plurality of categories comprise at least one of a domain category regarding the speech data, a function category of the electronic apparatus that received the speech data, a sentence structure category regarding the speech data, and a keyword category regarding words included in the speech data.

4. The method of claim 1, wherein the plurality of categories comprise complexity information corresponding to sentence length, and
    the selecting the category further comprises selecting a category whose global popularity is highest and whose usage frequency and complexity is lowest thereby generating the guide sentence.

5. The method of claim 3, wherein, in response to the sentence structure category being selected, the generating comprises inserting keywords included in the speech data into a sentence structure included in the selected category thereby generating the guide sentence.

6. The method of claim 3, wherein, in response to at least one of the domain category, the function category, and the keyword category being selected, the generating comprises generating the guide sentence based on pre-stored global popularity.

7. The method of claim 1, wherein the plurality of categories have a ranking order comprising a first category and a remainder category, further comprising:
    determining a guide sentence cannot be generated corresponding to the first category; and
    responsive to determining a guide sentence cannot be generated corresponding to the first category, generating a guide sentence corresponding to the remainder category.

8. The method of claim 1, further comprising providing the guide sentence to the user in at least one of preset intervals or in response to receiving a user command to output the guide sentence.

9. A server, comprising:
    a communicator configured to receive speech data corresponding to user speech from an electronic apparatus;
    a controller configured to determine a category of the speech data from among a plurality of categories; and
    a storage configured to store the speech data in the determined category,
    wherein the controller is further configured to determine a usage frequency and a global popularity of each of the plurality of categories, the usage frequency comprising a count of speech data of an individual user and the global popularity comprising a count of speech data of a plurality of users, select a category from among the plurality of categories based on the usage frequency and the global popularity, generate a guide sentence corresponding to the selected category, transmit the guide sentence to the electronic apparatus, and provide the guide sentence to the user in at least one of visual or audio form, so that the user may command the electronic apparatus using the guide sentence.

10. The server of claim 9, wherein the controller is configured to select a category whose usage frequency is lowest and global popularity is highest from among the plurality of categories.

11. The server of claim 9, wherein the plurality of categories comprise at least one of a domain category regarding the speech data, a function category of the electronic apparatus that received the speech data, a sentence structure category of the speech data, and a keyword category regarding words included in the speech data.

12. The server of claim 9, wherein the plurality of categories comprise complexity information corresponding to sentence length, and
    the controller is further configured to select a category whose global popularity is highest and whose usage frequency and complexity is lowest thereby generating the guide sentence.

13. The server of claim 11, wherein, in response to the sentence structure category being selected, the controller is configured to insert keywords included in the speech data into a sentence structure included in the selected category thereby generating the guide sentence.

14. The server of claim 11, wherein, in response to at least one of the domain category, the function category, and the keyword category being selected, the controller is configured to generate the guide sentence based on a pre-stored global popularity.

15. An apparatus for generating information for speech recognition, the apparatus comprising:
    a storage configured to store a usage frequency of a plurality of vocal commands corresponding to an electronic device;
    a controller configured to determine a vocal command from among the plurality of vocal commands and generate information about the vocal command corresponding to the electronic device based on at least one of a user's usage frequency of the vocal command, wherein the user's usage frequency comprises a count of the vocal command, and a global user usage frequency of the vocal command, wherein the global user usage frequency comprises a count of the vocal command; and an outputter configured to output the information about the vocal command in at least one of visual or audio form, wherein the information about the vocal command comprises a vocal command for controlling the electronic device.

16. The apparatus of claim 15, wherein the controller is configured to generate information about the vocal command whose user's usage frequency is lowest and global user usage frequency is highest.

17. The apparatus of claim 15, wherein the information about the vocal command comprises a guide statement in which keywords previously used by a user are inserted.

* * * * *